United States Patent
Basu et al.

(10) Patent No.: US 7,811,405 B2
(45) Date of Patent: Oct. 12, 2010

(54) ADHESIVE BONDING OF VEHICLE EXTERNAL PANELS TO REDUCE BOND-LINE READ-OUT

(75) Inventors: Soumendra K. Basu, Bangalore (IN); Jessica A. Schroeder, Sterling Heights, MI (US); Hamid G. Kia, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 437 days.

(21) Appl. No.: 11/848,303

(22) Filed: Aug. 31, 2007

(65) Prior Publication Data

US 2009/0056868 A1 Mar. 5, 2009

(51) Int. Cl.
*B32B 27/00* (2006.01)
*B32B 37/24* (2006.01)
*B32B 7/14* (2006.01)
*B32B 37/00* (2006.01)
*A61F 13/15* (2006.01)
*B29C 65/00* (2006.01)
*B29C 65/48* (2006.01)

(52) U.S. Cl. .............. 156/276; 156/242; 156/291; 156/292; 156/295

(58) Field of Classification Search .......... 156/60, 156/242, 245, 275.1, 275.3, 275.5, 275.7, 156/276, 290, 291, 292, 295, 307.1, 325, 156/326, 330

See application file for complete search history.

(56) References Cited

U.S. PATENT DOCUMENTS 5,362,120 A * 11/1994 Cornille, Jr. .......... 296/203.01
5,470,416 A * 11/1995 Herring et al. .............. 156/196
5,760,106 A * 6/1998 Pinnavaia et al. ........... 523/209
2003/0121606 A1* 7/2003 Damico et al. ............. 156/330
2004/0077778 A1* 4/2004 Hazan et al. ................ 524/589
2005/0140177 A1* 6/2005 Montagna et al. .......... 296/191
2007/0072981 A1* 3/2007 Miller ....................... 524/445

FOREIGN PATENT DOCUMENTS

WO WO 2005042630 A2 * 5/2005

OTHER PUBLICATIONS

Material Safety Data Sheet for Resinfusion 8604 epoxy resin, published Nov. 8, 2005.*
Technical Data Sheet for NANOCOR Nanomer I.30E nanoclay, published Oct. 2004.*
Technical Data Sheet for DOW DER 331 liquid epoxy resin.*
Uday K. Vaidya, et al., "Experimental-numerical studies of transverse impact response . . . ", Elsevier International Journal of Adhesion & Adhesives 26 (2006), pp. 184-198.

* cited by examiner

*Primary Examiner*—Richard Crispino
*Assistant Examiner*—Brian R Slawski
(74) *Attorney, Agent, or Firm*—Reising Ethington P.C.

(57) ABSTRACT

The bonding of polymeric panels with thermosetting adhesive compositions may lead to an unsightly image of the adhesive bond line on an external surface of the joined articles. This bond-line read-out is reduced or eliminated using an adhesive material with filler particles characterized by nanometer size clay platelets when the content of the filler particles does not exceed about five percent by volume of the uncured adhesive. Selective placement of the adhesive extending to the edges of the bonding surfaces of the polymeric members also reduces bond-line read-out.

10 Claims, 1 Drawing Sheet

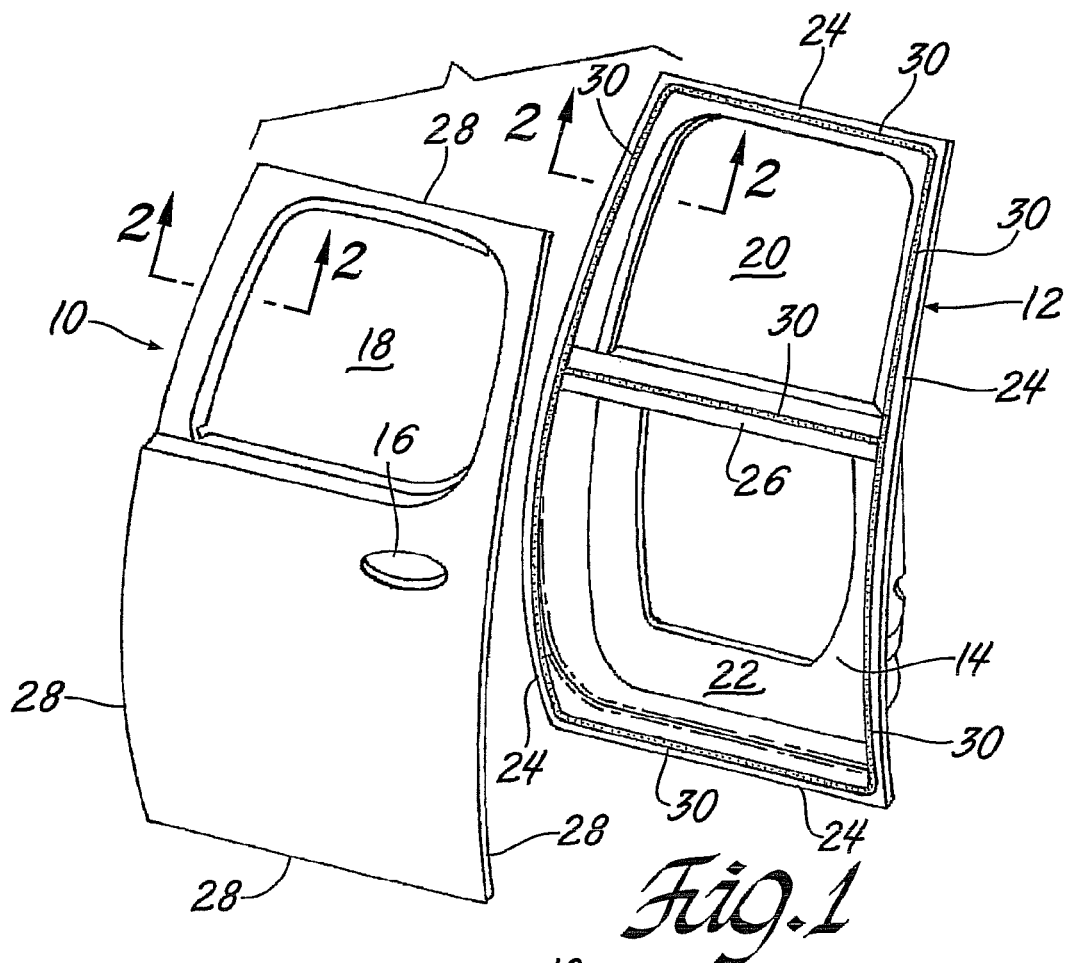
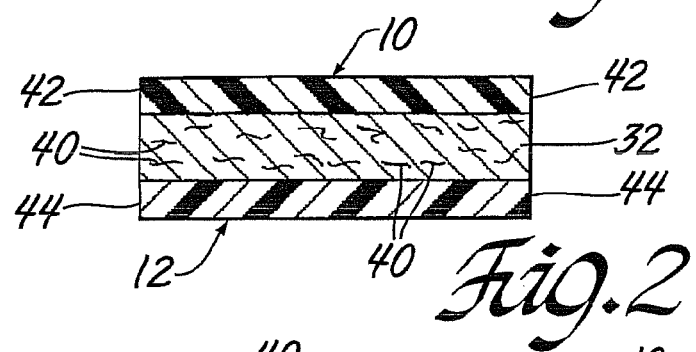
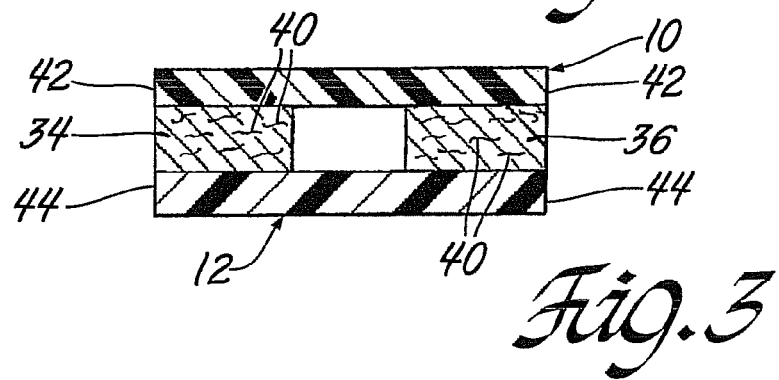

ADHESIVE BONDING OF VEHICLE EXTERNAL PANELS TO REDUCE BOND-LINE READ-OUT

TECHNICAL FIELD

This invention pertains to adhesive bonding of vehicle body panels having visible surfaces. More specifically, this invention pertains to adhesives and adhesive application practices for making strong adhesive bonds that reduce or eliminate the "read-out" of the adhesive bond line in the visible surface.

BACKGROUND OF THE INVENTION

Automotive vehicle body structures often include closure members, such as, doors, hoods, deck lids, tailgates, and the like that have complementary inner and outer panels that are joined at peripheral surfaces. Sometimes the manufacture of the body includes the attachment of a body panel like a vehicle top to a body frame structure. Where the panel members are both made of stamped metal alloys the pieces are often hemmed and welded at their edges. However, when one or both of the panel members are formed of a fiber reinforced polymer material, a bead of adhesive is applied to flange surfaces of one or both panels. The panels are positioned with overlying joining surfaces and pressed together and the assembly is heated to cure the adhesive bond. A continuing difficulty arises in that a surface deformation along the adhesive bond line is visible in outer (un-bonded) surfaces of the exterior panel. This bond-line read-out effect is usually viewed as a defect in the surface of the door or panel assembly when it is visible to the user of the vehicle. The avoidance or repair of such defects has been a continuing problem for automotive manufacturers.

Many polymeric vehicle body panels are made of sheet molding compound (SMC). SMC is a glass fiber reinforced thermosetting composition in which the polymer precursor material typically comprises styrene, an unsaturated polyester, filler, maturation agent, and catalyst. The reinforcing material comprises glass mat and chopped glass roving. The material is prepared in sheet form enclosed in sheets of polyethylene film. These sheets are laid in molds for forming thermoset body panels and other parts. Like panels may also be made from carbon composite materials which are thermosetting polymers reinforced with carbon fibers, often in the form of cloth layers.

Epoxy based adhesives are widely used for bonding SMC panels or other reinforced polymer panels. The epoxy precursor materials are often relatively low molecular weight addition polymers of bisphenol A and/or bisphenol F and epichlorohydrin. Amine-group terminated compounds may be used as catalysts. Urethane adhesives are also used in bonding reinforced polymer panels. These adhesives provide good bond strength in joining complementary panels or in attaching panels to metal frame members. But they have higher coefficients of thermal expansion than those of the polymeric or metal panels or frame members. Due to the difference in coefficient of thermal expansion, the adhesive and the polymer panels experience different degrees of expansion or shrinkage during thermal cycling for adhesive curing, paint baking, or other processing or environmental temperature cycling. The differential in thermal expansion/shrinkage of panel and the adhesive creates differential residual stresses at the joint that deforms the exterior panel yielding the visible bond-line.

Unsuccessful attempts have been made to eliminate the bond-line read-out by adding ten to forty percent by volume of glass and/or steel microspheres (of 75 to 150 micrometer diameters). The use of such fillers reduces the bond-line effect by reducing the difference in thermal expansion between the parts and adhesive. But the excessive filler content affects the strength of the adhesive bond. There remains a need to address the adhesive bonding of polymeric panels or other parts having surface appearance requirements.

SUMMARY OF THE INVENTION

In accordance with an embodiment of this invention, polymer panels and reinforced polymer panels may be adhesively bonded with little or no bond-line read-out using a polymeric adhesive containing nanometer-thick platelets of clay particles as the principal reinforcing filler material. As an example, montmorillonite particles that are about one nanometer in thickness and about one hundred to about six hundred nanometers in nominal diameter may be used. Since such clay particles are hydrophilic, it may be preferred to chemically modify the particles for dispersion in the polymeric precursor materials of the uncured adhesive. For example, an organically modified montmorillonite such as dimethyl dehydrogenated tallow montmorillonite may be used. Preferably, the nanometer size clay particles are used in amounts of up to about five volume percent of the adhesive.

Montmorillonite clays are hydrated silicates with hydroxide groups and containing calcium, aluminum, and magnesium. The crystal structure of the clay is characterized by alternating alumina and silica layers so that the clay particles may be used in the form of platelets with a very high ratio of diameter to thickness (aspect ratio). In the above example, the aspect ratio was in the range of about one hundred to six hundred. It is preferred to use filler particles in this bonding process that have an aspect ratio of at least 50. Preferably, these filler particles are used in place of other filler particles because the coefficient of thermal (CTE) of nanometer size, high aspect ratio filler-reinforced adhesives approaches that of the joined parts at very low volume percent (less than five volume percent) of added fillers. Further, since only a small volume fraction of fillers are added, the bond-line read-out on a visible surface of a bonded assembly can be eliminated or reduced without compromising the strength of the adhesive.

In many embodiments of the invention the adhesive will be a thermosetting material. But the practice of the invention is not limited to thermosetting adhesive formulations because differences in CTE values of adhesive and polymeric workpiece can lead to bond-line read-out due to other temperature cycling of the adhesive bonded parts. For example, room temperature chemically cured or moisture cured adhesive formulations using manometer size high aspect ration filler-reinforced clay filler may be used in the practice of the invention.

In a practice of the invention, an SMC body panel or other polymeric workpiece is positioned for adhesive bonding to another panel or to a body frame structure. The other member may be a polymer panel or a metal panel or frame member. One or more of such body panels or other workpieces have bonding areas with a thickness of about one to ten millimeters are susceptible to bond-line read-out after thermal curing of an adhesive and/or paint baking. A bead of thermosetting polymer adhesive with up to about five volume percent nanometer thick filler particles dispersed in the mobile adhesive mixture is applied to a predetermined bonding surface area of at least one of the parts to be joined.

An SMC body panel may typically have a peripheral flange region to which the nanoclay particle filled adhesive is applied. There may be other designated bonding regions on a part. Adhesive is typically transported from a one-part or two-part storage container, mixed into one-part, if necessary, and applied as a bead or strip onto the bonding regions of at least one of the workpieces. Often a computer-controlled robot device is used to carefully apply a bead or strip of the adhesive in a predetermined pattern on bonding surfaces of one or both parts to be joined. It is also found that the pattern of application of the adhesive strip may be important in managing the bonding of the parts without a visible surface deformity. Masking of the bonding surface may be used to better define the application of the adhesive material. As stated, the limited content, by volume, of nanometer-thick, high aspect ratio clay platelets in the adhesive is important to reduce the CTE difference, and therefore the differential shrinkage, between the adhesive and the joined parts around the adhesive interface.

Often a peripheral flange portion of an SMC panel has a bonding surface width in which a bead of adhesive is to be applied. The intent of the bonding process is to form an adhesive bond of a specified width along its pathway on or around an SMC panel. In one embodiment of this invention, it is found that bond-line read-out is minimized when the adhesive is applied, so that when the parts are pressed together, the lateral edges of the adhesive bond lie exactly on the intended edges of the bonding surface. In another embodiment of the invention, two adhesive beads are applied with a gap between them so that their respective outer edges lie exactly on the intended edges of the bonding surface.

Thus, the use of nanometer thick, high aspect ratio filler particles in a suitable adhesive composition permits the bonding of reinforced polymer parts with minimal bond-line read-out. And, as stated above, careful placement of strips of the adhesive with respect to the edges of the bonding area also reduces bond-line read-out.

The practice of the invention is particularly applicable where the adhesive bond joins workpieces that are up to about five to ten millimeters in thickness because it is in such relatively thin pieces with an interfacial adhesive layer that heating and cooling of the adhesive joint leads to bond-line read-out.

Other objects and advantages of the invention will be apparent from a detailed description of preferred embodiments of the practice of the invention. But these descriptions of embodiments are illustrative and not limiting of the practice of the invention.

BRIEF DESCRIPTION OF THE DRAWINGS

FIG. 1 illustrates representative shapes of a molded glass fiber reinforced polymer inner door panel and a reinforced polymer outer door panel that are in a juxtaposed position just prior to being brought together for adhesive bonding. A bead of adhesive has been applied to the attachment surface of the inner reinforced polymer panel.

FIG. 2 is a cross-sectional view at 2-2 of the outer and inner reinforced polymer panels of FIG. 1, now in a pressed-together position for adhesive bonding, illustrating a platelet-filled adhesive where the lateral edges of the adhesive strip precisely overlie the edges of the local bonding surfaces of the panels.

FIG. 3 is a cross-sectional view at 2-2 of the outer and inner reinforced polymer panels of FIG. 1 in a different adhesive application embodiment of the invention. The panel sections are shown in a pressed-together position for adhesive bonding illustrating a platelet-filled adhesive where two spaced apart beads of adhesive have been applied such that the outer edges of the two adhesive strips precisely overlie the edges of the bonding surfaces of the panels.

DESCRIPTION OF PREFERRED EMBODIMENTS

A practice of the invention will be illustrated where molded SMC inner and outer automotive vehicle door panels are adhesively bonded. However, it is to be understood that the invention is also applicable to adhesive bonding of other combinations of polymeric and metal parts and to the binding of other reinforced polymer parts.

In FIG. 1, a glass fiber reinforced sheet molding compound (SMC) polymer matrix outer panel 10 is seen positioned with its inner side (not visible in the figure) facing the inner side 14 of a SMC inner panel 12. Reinforced polymer outer panel 10 has been molded to have the top to bottom curvature of the side of a vehicle, a formed region 16 for a handle for opening and closing the door, and a framed-in window opening 18. Inner panel 12 has been molded from SMC material to complement the shape of outer panel 10. Inner panel 12 is shaped to define its corresponding window opening 20 and to provide a compartment (indicated generally at 22) for containing a mechanism for opening and closing a window and other components to be fitted within the bonded door panel assembly.

As best seen on the inner side 14 of inner panel 12 each molding has peripheral surfaces 24 (on inner panel 12) and a belt line surface 26 for bonding to the facing side of the mating panel. Outer panel 10 likewise has peripheral flange edges 28. These generally level, relatively thin, generally uniformly thick (e.g., five millimeters thick) peripheral flange surfaces 24, 26, 28 provide complementary engaging bonding surfaces for the facing panels 10, 12 that are to be attached with an adhesive bond.

In the adhesive bonding of these complementary inner and outer panels 10, 12 strips or bands of adhesive 30 are applied in a suitable pattern to surfaces 24 and 26 on inner surface 14 of inner panel 12. The panel is placed in a suitable fixture or workholding device in a position for careful application of the adhesive to predetermined locations. The strips or bands of adhesive composition are often carefully applied in a predetermined pattern to the bonding surface(s) of one of the pieces to be joined using, for example, a computer controlled robot arm or other adhesive applicator. The adhesive is applied in a bead, strip, or band on a bonding surface to achieve a suitably thick layer of adhesive covering a desired bonding surface area and pattern between the workpieces to be joined. Masking of the bonding surface with, for example, Teflon® tape or a mold release material may be practiced in defining the adhesive application pattern. After the adhesive is applied to at least one of the panels, the panels are pressed together against the adhesive in a door assembly and the assembly is, for example, heated to polymerize or cure the thermosetting composition to form a strong bond between the door panels or other workpieces.

The adhesive is applied to at least one of the panels 10, 12 so that when the panels (or other workpieces) are pressed together against the applied adhesive a compressed adhesive interface of desired thickness and cross-section is formed. By way of example, a compacted adhesive interface layer uniformly about one millimeter in thickness may be formed. One such layer is illustrated at 32 (between panels 10, 12 in the cross-sectional view of FIG. 2 and two parallel, spaced apart adhesive layers 34, 36 are illustrated between panels 10, 12 in the cross-sectional view of FIG. 3. The thicknesses of the adhesive layers are exaggerated in these figures for purposes of illustration.

Adhesive 30 may be of a known adhesive composition such as an epoxy adhesive material or a urethane adhesive material. The adhesive composition may be initially prepared in one-part or two-part formulations depending on a desired shelf life of the material before it is used in a bonding operation. Such formulations typically contain viscous but mobile liquid constituents that are curable to a strong adherent interfacial bond layer between surfaces of panels to be joined. The formulations may contain solid particles as catalysts or polymerization aids, or as additives for prolonging storage time. The formulations may contain solid particles or materials for coloring. And the uncured adhesive formulations may contain solid fillers. But, in accordance with this invention, an essential filler constituent is employed for reducing the CTE of the adhesive for the purpose of reducing or eliminating adhesive bond-line read-out on a surface of a bonded panel. The essential filler particles may be used as the sole solid filler constituent or, less preferred, in combination with other filler particles. As described above, the required filler component is characterized as being in the form of very thin platelets (of the order of a nanometer in thickness) with a very high aspect ratio (for example, platelet diameters of 100 to 600 nanometers). The platelet filler particles are used in amounts up to about five volume percent of the adhesive formulation to avoid an image of the adhesive bond on a visible surface of the bonded article. Montmorillonite clay particles are preferred, especially clay particles that have been treated for dispersion in the organic adhesive constituents.

The platelet filler material and its content in the adhesive are of primary importance in avoiding bond-line read-out, but the pattern of the adhesive interfacial layer also contributes to the reduction of bond line defects. This practice will be illustrated with further reference to FIGS. 2 and 3.

FIGS. 2 and 3 are like cross-sectional views taken at location 2-2 of window frame portions of outer panel 10 and inner panel 12. While panels 10 and 12 are illustrated in a juxtaposed, but spaced apart, position in FIG. 1, the panels are shown in their assembled position in FIGS. 2 and 3, pressed against the applied adhesive material. The illustrated window frame portions of the panels serve to illustrate bonding surfaces having bonding widths and the relationship of the compacted adhesive interface with respect to the width of the bonding area. It is to be understood that the peripheral bonding surfaces of panels 10, 12 may have a length in meters and the adhesive is applied over the totality of the length of the bonding surfaces. But as illustrated in single cross-sections in FIGS. 2 and 3, there is a preferred relationship between the width of the bonding surfaces and the width of the interfacial adhesive layer.

In FIG. 2, it is seen that the width of adhesive layer 32 substantially coincides with the width of the bonding surface at the illustrated portion of the panels 10, 12. Applied, compacted, and cured adhesive layer 32, with its essential platelet filler particles 40, extends precisely to the edges 42, 44 of window frame portions of panels 10, 12. And adhesive layer 32 is of substantially uniform thickness across the facing bonding surfaces of panels 10, 12. This coincidence of the adhesive bonding layer 32 with the width of the bonding surfaces of the SMC panels is found to distribute the differential residual stress in the bonded parts in such a way that minimizes bond-line read-out after thermal cycling experienced in curing the adhesive.

In FIG. 3 the platelet filler particle-containing adhesive 30 was initially applied as two beads. Both adhesive beads may be applied to one panel or one bead to each panel. After the panels have been assembled and pressed together two adhesive interfacial layers 34, 36 are formed as illustrated in FIG. 3. The interfacial adhesive layers 34, 36 are equi-width and spaced apart with a gap between them. The overall width of the adhesive layer, 34 along with 36, is determined based on the structural strength required by the adhesive joint. As long as the total width of the adhesive layer is lower than the flange width (42 or 44), splitting the adhesive layer into two equal width beads and placing them at the two ends of the flange would help reducing bond-line read-out. The outer edge of interfacial adhesive layer 34 coincides with the left outer edges 42, 44 of panels 10, 12 (as viewed in FIG. 3) and the outer edge of interfacial adhesive layer 36 coincides with the right outer edges 42, 44 of panels 10, 12. Again this adhesive interfacial relationship of spaced layers with outer edges at the boundaries of the bonding surfaces is found to reduce bond-line read-out after curing of the thermosetting adhesive and any other subsequent thermal processing of the panels.

Practices of the invention have been illustrated in terms of some preferred embodiments. But the illustrations are not intended to be limiting of the practice of the invention.

The invention claimed is:

1. A method of forming an adhesive bond between an attachment portion of a fiber-reinforced polymeric panel for an automotive vehicle and another vehicle workpiece when the panel has a visible external surface, the attachment portion of the panel and other workpiece each having a surface with a bonding area for the adhesive bond, the bonding areas having a length and a width, the attachment portion of the panel having a thickness not greater than about ten millimeters and the width of the bonding area of the attachment portion being defined by a first edge and second edge, the method comprising;

applying a strip of thermosetting polymeric adhesive material along the length and within the width of at least one of the bonding areas, the adhesive material containing platelets of nanometer scale thick filler particles having an aspect ratio of at least fifty in an amount up to about five volume percent of the adhesive material, the filler amount and the placement of the adhesive strip being determined to minimize visible surface deformation on the external surface of the panel;

pressing the bonding areas together in a bonding position of the panel and workpiece to form an adhesive layer of substantially uniform thickness between the bonding areas with the lateral edges of the adhesive layer extending to the width of the bonding areas including to the edges of the attachment portion; and heating the workpieces to thermally set the adhesive layer.

2. A method as recited in claim 1 in which the filler particles are montmorillonite clay.

3. A method as recited in claim 1 in which the filler particles are montmorillonite clay that has been processed for dispersion in the adhesive.

4. A method as recited in claim 1 in which the workpiece is a reinforced polymer workpiece.

5. A method as recited in claim 1 in which the fiber-reinforced polymeric panel is formed of glass fiber-reinforced sheet molding compound.

6. A method of forming an adhesive bond between an attachment portion of a fiber-reinforced polymeric panel for an automotive vehicle and another vehicle workpiece when the panel has a visible external surface, the attachment portion of the panel and other workpiece each having a surface with a bonding area for the adhesive bond, the bonding areas having a length and width, the attachment portion of the panel having a thickness not greater than about ten millimeters and the width of the bonding area of the attachment portion being defined by a first edge and a second edge, the method comprising;

applying first and second parallel spaced-apart strips of adhesive along the width of one of the bonding areas, the adhesive material containing platelets of nanometer scale thick filler particles having an aspect ratio of at least fifty in an amount up to about five volume percent of the adhesive material, the filler amount and the placement of the adhesive strips being determined to minimize visible surface deformation on the external surface of the panel;

pressing the bonding areas together in a bonding position of the panel and workpiece to form, between the bonding areas, first and second adhesive layers with a gap therebetween, the first and second layers each having two lateral edges and being of substantially equal lateral extent and of substantially uniform thickness; wherein one lateral edge of the first adhesive layer extends to the first edge of the attachment portion and one lateral edge of the second adhesive layer extends to the second edge of the attachment portion; and heating the workpieces to thermally set the adhesive layer.

7. A method as recited in claim 6 in which the filler particles are montmorillonite clay.

8. A method as recited in claim 6 in which the filler particles are montmorillonite clay that has been processed for dispersion in the adhesive.

9. A method as recited in claim 6 in which the workpiece comprises a fiber reinforced polymer.

10. A method as recited in claim 6 in which the fiber reinforced polymer is formed of glass fiber-reinforced sheet molding compound.

* * * * *